United States Patent
Ma et al.

(10) Patent No.: US 11,685,587 B2
(45) Date of Patent: Jun. 27, 2023

(54) PACKAGING COMPOSITE MATERIAL COMPRISING POLARIZING FILMS AND PACKAGING COMPRISING SAID MATERIAL

(71) Applicant: The Coca-Cola Company, Atlanta, GA (US)

(72) Inventors: Xun Ma, Shanghai (CN); Zhiheng Zhao, Guangdong (CN); Zhijun Cheng, Shanghai (CN); Wen Zeng, Shanghai (CN); Huan Xiong, Shanghai (CN)

(73) Assignee: THE COCA-COLA COMPANY, Atlanta, GA (US)

( * ) Notice: Subject to any disclaimer, the term of this patent is extended or adjusted under 35 U.S.C. 154(b) by 356 days.

(21) Appl. No.: 16/605,716

(22) PCT Filed: Apr. 19, 2018

(86) PCT No.: PCT/US2018/028276
§ 371 (c)(1),
(2) Date: Oct. 16, 2019

(87) PCT Pub. No.: WO2018/195258
PCT Pub. Date: Oct. 25, 2018

(65) Prior Publication Data
US 2020/0130918 A1    Apr. 30, 2020

(30) Foreign Application Priority Data
Apr. 19, 2017    (CN) .................. 201710257517.2

(51) Int. Cl.
*B65D 81/30*    (2006.01)
*B32B 27/30*    (2006.01)
(Continued)

(52) U.S. Cl.
CPC ............. *B65D 81/30* (2013.01); *B32B 7/023* (2019.01); *B32B 7/12* (2013.01); *B32B 27/08* (2013.01);
(Continued)

(58) Field of Classification Search
CPC ......... B65D 81/30; B32B 7/023; B32B 27/08; B32B 27/306; B32B 27/36; B32B 2250/24; B32B 2307/42; B32B 2553/00; C09J 7/35
See application file for complete search history.

(56) References Cited

U.S. PATENT DOCUMENTS 4,878,748 A    11/1989    Johansen et al.
2003/0082314 A1*    5/2003    Higashi ............... G02F 1/13362
                                                        428/1.31
(Continued)

FOREIGN PATENT DOCUMENTS

CN       103587181 A    2/2014
JP       2004-141631 A    5/2004
(Continued)

OTHER PUBLICATIONS

[NPL-1] Inui et al. (JP 2014-166707 A); Sep. 2014 (EPO machine translation to English). (Year: 2014).*
(Continued)

*Primary Examiner* — Frank J Vineis
*Assistant Examiner* — Donald M Flores, Jr.
(74) *Attorney, Agent, or Firm* — Eversheds Sutherland (US) LLP

(57) ABSTRACT

Disclosed in the present invention is a packaging composite material comprising polarizing films, the packaging composite material comprising: a polarizing layer, comprising two or more layers of polarizing film, wherein polarization directions of at least two layers of polarizing film have an
(Continued)

included angle which is not 0°. The packaging composite material of the present invention has a simple structure, strong light-blocking properties, a high light-blocking rate, and a broad-spectrum light-blocking effect. Also disclosed in the present invention are the use of the packaging composite material in packaging, and the use of the packaging composite material in a label. When used as packaging or a label, the packaging composite material can extend the shelf life of products which need to be stored in the dark.

13 Claims, 1 Drawing Sheet

(51) Int. Cl.
| | |
|---|---|
| *B32B 27/36* | (2006.01) |
| *B32B 27/08* | (2006.01) |
| *B32B 7/023* | (2019.01) |
| *B32B 7/12* | (2006.01) |
| *B65D 65/40* | (2006.01) |
| *C09J 7/35* | (2018.01) |
| *C08J 5/18* | (2006.01) |
| *C08J 5/12* | (2006.01) |
| *C09J 5/06* | (2006.01) |
| *G02B 5/30* | (2006.01) |

(52) U.S. Cl.
CPC .......... *B32B 27/306* (2013.01); *B32B 27/36* (2013.01); *B65D 65/40* (2013.01); *C08J 5/128* (2013.01); *C08J 5/18* (2013.01); *C09J 5/06* (2013.01); *C09J 7/35* (2018.01); *B32B 2250/05* (2013.01); *B32B 2250/24* (2013.01); *B32B 2307/402* (2013.01); *B32B 2307/42* (2013.01); *B32B 2553/00* (2013.01); *C08J 2329/04* (2013.01); *C08J 2367/02* (2013.01); *C08J 2429/04* (2013.01); *C08J 2467/04* (2013.01); *C09J 2429/00* (2013.01); *G02B 5/3041* (2013.01)

(56) References Cited

U.S. PATENT DOCUMENTS

| | | |
|---|---|---|
| 2007/0295945 A1 | 12/2007 | Hayakawa et al. |
| 2013/0094088 A1* | 4/2013 | Merrill ................ B42D 25/382 |
| | | 264/2.6 |
| 2014/0146379 A1 | 5/2014 | Sakai |

FOREIGN PATENT DOCUMENTS

| | | | |
|---|---|---|---|
| JP | 2005324355 A | * | 11/2005 |
| JP | 2014166707 A | * | 9/2014 |
| JP | 2014166707 A | | 9/2014 |
| JP | 2015-024833 A | | 2/2015 |
| JP | 2015024833 A | * | 2/2015 |
| JP | 2017-197284 A | | 11/2017 |
| KR | 100700409 B1 | | 3/2007 |

OTHER PUBLICATIONS

[NPL-2] Tamura et al. (JP 2015-024833 A); Feb. 5, 2015 (EPO machine translation to English). (Year: 2015).*
[NPL-3] Fujita et al. (JP 2005-324355 A); Nov. 24, 2005 (EPO machine translation to English). (Year: 2005).*
International Search Report and Written Opinion, PCT/US18/028276, 10 pages, dated Aug. 8, 2018.
First Office Action issued by the Chinese Intellectual Property Office, dated Jun. 22, 2021 (14 pp.).
First Office Action issued by the Japanese Intellectual Property Office in Japanese App. No. 2019556580, dated Jan. 27, 2022 (11 pp.).

* cited by examiner

PACKAGING COMPOSITE MATERIAL COMPRISING POLARIZING FILMS AND PACKAGING COMPRISING SAID MATERIAL

TECHNICAL FIELD

The present invention relates to a packaging composite material. More specifically, it relates to a packaging composite material capable of blocking light, and packaging comprising the same.

BACKGROUND ART

"Packaging" is a general name for containers, materials and auxiliary articles used in accordance with a given technical solution, which protect products, facilitate storage and transportation, and promote sales in the course of circulation, and are used widely in everyday life. Examples are food packaging, building materials packaging, medicine packaging, etc. With the increase in packaging safety requirements and consumer consumption levels, packaging materials are becoming ever more diverse. Furthermore, characteristics of packaging materials such as light blocking, oxygen blocking, carbon dioxide blocking, water vapour blocking, high-temperature resistance, mechanical properties and chemical stability all restrict the use thereof in actual production and life.

A major feature of food packaging materials is the pursuit of food flavour and safety; at the same time, the shelf life of the packaged food must also be extended. Based on such demands, the development of various barrier-type packaging materials and packaging technologies has been given impetus. In the case of certain materials or food and drink products which need to be stored in the dark, the effective storage thereof places high demands on the light-blocking properties of packaging materials. For example, in the case of photosensitive foods (including drinks), irradiation by ultraviolet light and visible light can induce photooxidative degradation of substances therein such as vitamins, fats and protein, causing spoiling of the product and producing odours. In the case of drinks, in particular milk and fruit juice, sufficient light-blocking protection is needed so as to extend the shelf life thereof.

In the prior art, packaging materials are generally endowed with a certain degree of light-blocking properties by adding an inorganic additive (such as $TiO_2$) or an organic light-blocking additive, etc., to the packaging materials. For example, In the Chinese invention patent application with publication no. CN102604184A (invention title: Light-blocking PE film for food packaging), blocking of light rays in a specific waveband (400-500 nm) by a PE film is increased by adding the photosensitizer riboflavin to a PE masterbatch, to obtain a light-blocking thin film, which is used as food packaging for slowing down light oxidation of the packaged food. However, the light-blocking thin film provided in said invention can only block light with a wavelength in the waveband range 400-500 nm, so the light-blocking range is narrow, and the application scope and effects are limited. In the master's thesis entitled "Study on optional light-absorbing packaging material for supermarket micro-processed vegetables" (Tianjin University of Science and Technology, 2011), the author JIA Jinxia obtained a thin film material which reduces light transmittance, by adding an ultraviolet absorbing agent and a hindered amine light stabilizer to an LDPE thin film. When such a thin film capable of reducing light transmittance is used as a packaging material, the shelf life of supermarket vegetables is extended to certain degree. In the invention patent application with publication no. CN105813836A (invention title: Moisture-blocking, oxygen-blocking and light-blocking thermoformable blister material for packaging foods and cosmetics, medical equipment and medicines), a multi-layer material for packaging a preparation containing probiotic microbes is disclosed. In said patent application, the multi-layer material for packaging a preparation containing probiotic microbes can be obtained by metallizing the surface of a material such as the polymer PP, PVC or PET, and then performing a joining operation with adhesive.

However, the abovementioned disclosed technical solutions are all unable to achieve a wide-spectrum light-blocking effect.

Content of the Invention

One object of the present invention is to provide a structurally simple packaging composite material having a broad-spectrum light-blocking effect.

A second object of the present invention is to provide the use of the packaging composite material having a broad-spectrum light-blocking effect in packaging, with the aim of extending the shelf life of light-sensitive products.

A third object of the present invention is to provide the use of the packaging composite material having a broad-spectrum light-blocking effect in a label.

To achieve the first object above, the present invention provides a packaging composite material comprising polarizing films, the packaging composite material comprising:

a polarizing layer, comprising two or more layers of polarizing film;

wherein polarization directions of at least two layers of polarizing film have an included angle which is not 0°.

Preferably, the packaging composite material further comprises a first surface layer located on one side of the polarizing layer.

More preferably, the packaging composite material further comprises a second surface layer located on another side of the polarizing layer.

Preferably, a material of the surface layer is selected from one of PE, PETG, PVC, PVA, PC, PP, PS, PET, PBT, EVA, EVOH, PLA, PEF, PEN, PCTG, PBAT, PBST, PVDC and PA.

Preferably, the polarizing layer further comprises a polarizing film bonding layer located between the polarizing films.

More preferably, a material of the polarizing film bonding layer is selected from one of polyvinyl alcohol adhesives, acrylate adhesives, ethylene-vinyl acetate copolymer adhesives, epoxy resin adhesives, unsaturated polyester adhesives and vinyl acetate resin adhesives.

Preferably, the packaging composite material further comprises a surface layer bonding layer located between the polarizing layer and the first surface layer.

Preferably, the packaging composite material further comprises surface layer bonding layers located between the polarizing layer and the first and second surface layers respectively.

More preferably, a material of the surface layer bonding layer is selected from one of polyvinyl alcohol adhesives, acrylate adhesives, ethylene-vinyl acetate copolymer adhesives, epoxy resin adhesives, unsaturated polyester adhesives and vinyl acetate resin adhesives.

Preferably, polarization directions of at least two layers of polarizing film have an included angle of 45°-135°.

More preferably, polarization directions of at least two layers of polarizing film have an included angle of 80°-100°.

Most preferably, polarization directions of at least two layers of polarizing film have an included angle of 90°.

Preferably, amongst the polarizing films, polarization directions of at least two polarizing films have an included angle which is not 0°.

Preferably, the polarizing layer comprises 2-10 layers of polarizing film.

More preferably, the polarizing layer comprises 2-6 layers of polarizing film.

The second object of the present invention is to provide the use of the packaging composite material comprising polarizing films as described above in packaging.

The packaging composite material of the present invention may be used as packaging in the packaging field, according to actual light avoidance requirements. For example, it may be used as food packaging, medicine packaging or building packaging, etc.

Preferably, the packaging composite material comprising polarizing films comes into direct contact with contents.

Preferably, in the packaging composite material comprising polarizing films, the thickness of the polarizing layer is 20 nm-10 mm, and the thickness of each polarizing film is 10 nm-1 mm.

The third object of the present invention is to provide the use of the packaging composite material comprising polarizing films as described above in a label.

When the packaging composite material comprising polarizing films according to the present invention is used as a label having a light barrier effect, the label has light-blocking properties. The thickness of the polarizing layer in the packaging composite material may be selected by those skilled in the art according to actual circumstances, such as the thickness of the label.

Preferably, in the packaging composite material, the thickness of the polarizing layer is 20 nm-10 mm. The thickness of each polarizing film is 10 nm-100 microns.

More preferably, in the packaging composite material, the thickness of the polarizing layer is 20 nm-1 mm.

Most preferably, in the packaging composite material, the thickness of the polarizing layer is 20 nm-200 microns.

The Beneficial Effects of the Present Invention are as Follows:

The packaging composite material of the present invention has a simple structure. By providing the polarizing layer comprising two or more layers of polarizing film in the packaging composite material, and by controlling the included angle of polarization directions of the polarizing films, the packaging composite material obtained is endowed with a broad-spectrum light-blocking effect. Moreover, when used as packaging, the packaging composite material can greatly extend the shelf life of products which need to be stored in the dark.

DESCRIPTION OF THE ACCOMPANYING DRAWINGS

Particular embodiments of the present invention are explained in further detail below with reference to the accompanying drawings.

PARTICULAR EMBODIMENTS

Figure 1:
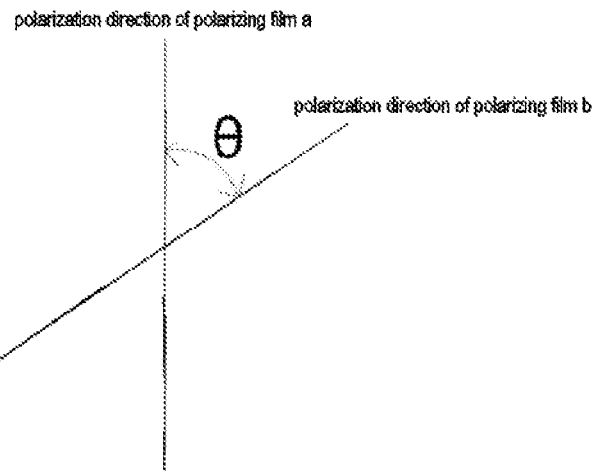
FIG. 1 shows a schematic diagram of the included angle of polarization directions of polarizing films.

In order to illustrate the present invention more clearly, the present invention is explained further below with reference to preferred embodiments and the accompanying drawings. Similar components in the drawings are represented with identical reference labels. Those skilled in the art should understand that the content specifically described below is explanatory but not limiting, and should not be used to limit the scope of the protection of the present invention.

FIG. 1 shows a schematic diagram of the included angle of polarization directions of polarizing films, as shown. In the figure, the included angle θ between the respective polarization directions of two polarizing films a and b is the included angle of the polarization directions of the polarizing films.

Figure 2:
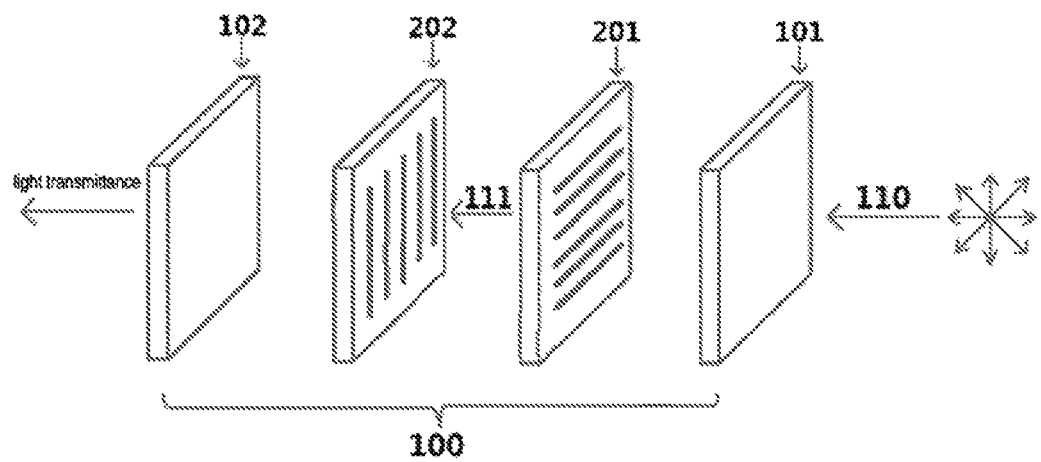
FIG. 2 shows a schematic diagram of a packaging composite material comprising polarizing films in embodiment 1 of the present invention.

FIG. 2 shows a schematic diagram of a packaging composite material comprising polarizing films in embodiment 1 of the present invention. The packaging composite material 100 comprises in sequence a first surface layer 101, a polarizing layer comprising a first polarizing film 201 and a second polarizing film 202, and a second surface layer 102, wherein the included angle of the polarization direction of the first polarizing film 201 and the polarization direction of the second polarizing film 202 is roughly 90°. When natural light 110 passes through the first polarizing film 201 after being transmitted through the first surface layer 101, the natural light is polarized by the first polarizing film 201 to obtain polarized light 111. When the polarized light 111 passes through the second polarizing film 202, only a small amount or an extremely small amount of light is transmitted through the second polarizing film 202, and virtually no light passes through the second surface layer 102 of the packaging material 100; the blocking of light is thereby realized. The first surface layer 101 and the second surface layer 102 attached to outer sides of the first polarizing film 201 and the second polarizing film 202 not only have the effect of protecting the polarizing films, avoiding loss of the polarizing characteristics of the polarizing films due to wear during use; they can also provide safety and strength properties which meet the requirements of use, according to the environment in which the packaging composite material is used. When the polarizing films themselves can provide the required properties and sufficient strength, it is possible to omit one or both surface layers, and use the polarizing layer comprising the first polarizing film 201 and the second polarizing film 202 directly as the packaging composite material. It will be understood that, depending on the environment of use of the packaging material, a surface layer may be formed on just one side of the polarizing layer, or surface layers may be formed on both sides of the polarizing layer as described above. The direction in which light rays are incident to the packaging composite material may be unrelated to a direction of the polarizing layer but related to the choice of surface layer material.

A main body material of the polarizing film includes but is not limited to being selected from PVA, EVA, PETG and PE, etc. The polarizing film is obtained by endowing the main body material with a polarizing characteristic. Methods of obtaining a polarizing film which are suitable for the present invention include but are not limited to, for example, absorbing iodine and/or a dichroic dye into a polyvinyl alcohol thin film, or an ethylene-vinyl acetate copolymer saponified film or analog, and subjecting the same to stretching to prepare the polarizing film. The thickness of each polarizing film used in the packaging composite material is preferably kept within the range of 10 nanometers-100 microns; the thickness of the polarizing layer may be chosen appropriately according to the thickness etc. of the packaging material used in an actual application.

The polarizing films are joined by lamination to form the polarizing layer. There are many types of lamination; those skilled in the art may select a particular lamination method according to the actual polarizing film structure and properties. For example, the polarizing films may be joined by directly applying force to surfaces of the polarizing films; particular methods of implementation include but are not limited to pressing together, for example thermal pressing.

In addition, the polarizing films may be joined by providing a polarizing film bonding layer between the polarizing films. The polarizing film bonding layer is used to firmly join adjacent polarizing films, and does not affect the light polarization characteristics of the polarizing films; the polarizing film bonding layer material may be specifically selected according to characteristics of the polarizing film material. In a particular embodiment, an adhesive may be chosen as the polarizing film bonding layer material. For example, adhesives include but are not limited to one selected from polyvinyl alcohol adhesives, acrylate adhesives, ethylene-vinyl acetate copolymer adhesives, epoxy resin adhesives, unsaturated polyester adhesives and vinyl acetate resin adhesives, etc.

The materials of the first surface layer and the second surface layer attached to the outer sides of the polarizing layer may be the same or different. Based on the characteristics of the polarizing film material, and under the conditions that the light polarization effect of the polarizing layer is ensured and the compatibility of materials with the polarizing film material is taken into account, etc., those skilled in the art may select a corresponding surface layer material. For example, the material of the first surface layer and/or the second surface layer may respectively be independently selected from one of PE, PETG, PVC, PVA, PC, PP, PS, PET, PBT, EVA, EVOH, PLA, PEF, PEN, PCTG, PBAT, PBST, PVDC and PA. Furthermore, in a particular embodiment, a method for forming the surface layer that is more suitable for the surface layer material specifically chosen may be selected according to said material. For example, surface layer forming methods include but are not limited to casting, rolling and solvent methods.

There are many methods of attaching the surface layers to the outer sides of the polarizing layer; all methods capable of enabling the surface layers to be firmly joined to the polarizing layer without affecting the light polarization effect of the polarizing layer, and enabling the composite material obtained to be used as a packaging material, are acceptable. A more preferred joining method consists of directly applying force to the surface layer and the joining polarizing layer surface, to achieve joining of the two, for example thermal pressing; as another more preferred joining method, the surface layer may be joined to the polarizing layer during forming, for example, using the solvent method to dissolve the surface layer material, then pouring onto the polarizing layer surface, and drying to achieve joining; as another more preferred joining method, a surface layer bonding layer may be provided between the polarizing layer and the first surface layer, or between the polarizing layer and the second surface layer, or between the polarizing layer and the first and second surface layers respectively, to firmly join the first surface layer and/or the second surface layer to the polarizing layer, without affecting the light polarization characteristics of the polarizing layer. An adhesive may be chosen as the material of the surface layer bonding layer, for example one of polyvinyl alcohol adhesives, acrylate adhesives, ethylene-vinyl acetate copolymer adhesives, epoxy resin adhesives, unsaturated polyester adhesives and vinyl acetate resin adhesives, etc. The thickness of the surface layer may be selected appropriately according to the requirements regarding strength and safety etc. of the packaging material used in an actual application.

Those skilled in the art may determine the number of polarizing films in the abovementioned packaging composite material and the included angle between the polarization directions of the polarizing films according to the optical characteristics, material characteristics, requirements of use and light transmission effects of the polarizing films. According to another preferred embodiment of the present invention, the polarizing layer may comprise multiple polarizing films, preferably 2-10 layers of polarizing films, more preferably 2-6 layers of polarizing films. Amongst the polarizing films, the polarization directions of at least two polarizing films have an included angle which is not 0 degrees, thus it can be ensured that a good light-blocking effect is achieved. Preferably, the polarization direction included angle between each pair of polarizing films is not 0 degrees. Furthermore, amongst the polarizing films, preferably, the polarization directions of at least two polarizing films have an included angle of 45-135 degrees, more preferably 80-100 degrees, most preferably 90 degrees.

When the above technical solution is adopted, a packaging composite material with a broad-spectrum light-blocking effect can be obtained.

The packaging composite material comprising polarizing films in the present invention has a broad-spectrum light-blocking effect, and so may be applied in fields where light-blocking processing is required, such as the packaging field. In another preferred embodiment of the present invention, the packaging composite material is used in the packaging field as packaging, according to actual light avoidance requirements. For example, the abovementioned packaging composite material may be used as food packaging, medicine packaging or building packaging, etc. In another preferred embodiment of the present invention, the packaging composite material comprising polarizing films comes into direct contact with contents, wherein the contents may be food, medicine or building materials etc. which need to be stored in the dark. In another preferred embodiment of the present invention, in the packaging composite material used for packaging, the thickness of the polarizing layer is preferably 20 nm-10 mm, and the thickness of each polarizing film is 10 nm-1 mm.

The packaging composite material capable of blocking light according to the present invention may be used as a label having a light barrier effect, so that the label is endowed with light-blocking properties. In another preferred embodiment of the present invention, the thickness of the polarizing layer in the packaging composite layer is 20 nm-10 mm, and the thickness of each polarizing film is 10 nm-100 microns. In another preferred embodiment of the present invention, the thickness of the polarizing layer in the packaging composite material is 20 nm-1 mm. In another most preferred embodiment of the present invention, the thickness of the polarizing layer in the packaging composite material is 20 nm-200 microns.

In the absence of a specific explanation, all reagents and starting materials used in the present invention may be obtained by purchasing on the market or by conventional means in the art.

Furthermore, it must be noted that in the absence of a specific explanation, any range recorded in the present invention includes the end values and any values between the end values, and any sub-range formed by the end values or any values between the end values.

Besides the above explanation, all process steps not specifically mentioned in the preparation methods of the present invention and all devices used may employ conventional devices in the art or be carried out with reference to existing technology in the art.

An explanation is given below with reference to certain particular embodiments.

Embodiment 1

A method for preparing a packaging composite material comprising a polarizing film is as follows:

Two layers of polyvinyl alcohol film of thickness 60 microns (degree of polymerization 2400, degree of saponification 99.9 mol % or more) are separately placed in pure water at 30° C., being kept in a tensioned state and not relaxed, and impregnated for about 130 seconds, such that the films are fully swelled; the films are then dyed by being impregnated in an aqueous solution in which the weight ratio of iodine/potassium iodide/water is 0.02/1.5/100, while being uniaxially stretched. Next, the films undergo boric acid processing by being impregnated in an aqueous solution at 60° C. in which the weight ratio of potassium iodide/boric acid/water is 10/5/100, while being uniaxially stretched, until the cumulative multiple of stretching is 5.9 times relative to the original state, then the two layers of uniaxially stretched film are quickly laminated, wherein an included angle of stretching directions of the two layers of film after lamination is 90° (i.e. the stretching directions of the two polarizing films are perpendicular, and the included angle of polarization directions is 90°). A force is applied perpendicular to the film surfaces, such that the film layers are tightly joined. Finally, water washing is carried out for about 10 seconds in pure water at 10° C., then drying is carried out for 5 minutes at 60° C., to obtain a polarizing layer with a thickness of 21.6 microns.

Two layers of polyvinyl alcohol thin film of thickness 14 microns, which has not undergone the processing described above, are then taken, and used as a first surface layer and a second surface layer respectively; the two surface layers are joined to two sides of the polarizing layer respectively, and thermal pressing is performed such that the surface layers are joined tightly to the polarizing layer, to obtain a packaging composite material comprising polarizing films. The packaging composite material has a broad-spectrum light-blocking effect, and when used as packaging, can extend the shelf life of light-sensitive products.

Embodiment 2

A method for preparing a packaging composite material comprising a polarizing film is as follows:

Polyvinyl alcohol film of thickness 75 microns (degree of polymerization 2400, degree of saponification 99.9 mol % or more) is placed in pure water at 30° C., being kept in a tensioned state and not relaxed, and impregnated for about 130 seconds, such that the film is fully swelled; the film is then dyed by being impregnated in an aqueous solution in which the weight ratio of iodine/potassium iodide/water is 0.02/1.5/100, while being uniaxially stretched. The film then undergoes boric acid processing by being impregnated in an aqueous solution at 60° C. in which the weight ratio of potassium iodide/boric acid/water is 10/5/100, while being uniaxially stretched, until the cumulative multiple of stretching is 5.9 times relative to the original state; next, the film is impregnated at 40° C. for about 30 seconds in an aqueous solution in which the weight ratio of potassium iodide/boric acid/water is 10/3/100, thereby undergoing a second boric acid processing operation, while causing the stretching of the film to be relaxed by about 3% in the stretching direction (the final multiple of stretching is 5.72 times). Finally, water washing is carried out for about 10 seconds in pure water at 10° C., then drying is carried out for 5 minutes at 60° C., to obtain a polarizing film with a thickness of 13.1 microns.

Three layers of the polarizing film thus prepared are taken, and joining of the polarizing films is achieved by spreading a polyvinyl alcohol adhesive on the polarizing films; during lamination, it is ensured that the polarization direction included angle between first and second layers of polarizing film is 45°, and that the polarization direction included angle between first and third layers of polarizing film is 80° (the polarization direction being the stretching direction of the polarizing film); drying is carried out for 2 minutes at a temperature of 60° C., to obtain a polarizing layer.

One layer of polylactic acid film of thickness 18 microns, which has not undergone the processing described above, is then taken, and used as a first surface layer; then a polyvinyl alcohol adhesive is spread on one surface thereof, and bonding to one outer surface of the polarizing layer is carried out; drying is carried out for 5 minutes at a temperature of 62° C., to obtain a packaging composite material comprising polarizing films.

The packaging composite material has a broad-spectrum light-blocking effect, and when used as packaging, can extend the shelf life of light-sensitive products.

Embodiment 3

A method for preparing a packaging composite material comprising a polarizing film is as follows:

A polarizing layer is prepared according to the preparation method in the sections "Example—single fiber" and "Example—bare fiber array" disclosed in the invention patent with application no. "200780031784.2" and invention title "Multilayer polarizing fibers and polarizers using same", wherein polymer X is LMPEN (a copolymer made from 90% PEN/10% PET), and polymer Y is PETG.

The polarizing layer thus prepared may be used directly as a packaging composite material. Those skilled in the art could, according to actual requirements, also join a surface layer to an outer surface of the polarizing layer obtained, for use as a packaging composite material. The packaging composite material has a broad-spectrum light-blocking effect, and when used as packaging, can extend the shelf life of light-sensitive products.

Clearly, the above embodiments of the present invention are merely examples which are given for the purpose of clearly explaining the present invention, and by no means limit embodiments of the present invention. Those skilled in the art could make other changes or modifications in various forms, based on the above explanation. All obvious changes or modifications extended from the technical solution of the present invention still fall within the scope of protection of the present invention.

The invention claimed is:
1. A packaging composite material comprising:
a polarizing layer, comprising three or more layers of uniaxially-stretched polarizing film, wherein each layer of polarizing film has been uniaxially stretched in a stretching direction and wherein each layer of polarizing film has a polarization direction corresponding to the stretching direction;

wherein the polarization directions of at least two layers of the three or more layers of polarizing film have an included angle of 45°-135°, wherein amongst the polarizing films, the polarization directions of at least two polarizing films have an included angle which is not 0°, and wherein the packaging composite material has a light-blocking effect.

2. The packaging composite material as claimed in claim 1, wherein the packaging composite material further comprises a first surface layer located on one side of the polarizing layer.

3. The packaging composite material as claimed in claim 2, wherein the packaging composite material further comprises a second surface layer located on another side of the polarizing layer.

4. The packaging composite material as claimed in claim 3, wherein a material of at least one of the first surface layer and the second surface layer is selected from one of PE, PETG, PVC, PVA, PC, PP, PS, PET, PBT, EVA, EVOH, PLA, PEF, PEN, PCTG, PBAT, PBST, PVDC and PA.

5. The packaging composite material as claimed in claim 3, wherein the packaging composite material further comprises surface layer bonding layers located between the polarizing layer and the first and second surface layers respectively.

6. The packing composite material as claimed in claim 5, wherein a material of the surface layer bonding layers is selected from one of polyvinyl alcohol adhesives, acrylate adhesives, ethylene-vinyl acetate copolymer adhesives, epoxy resin adhesives, unsaturated polyester adhesives and vinyl acetate resin adhesives.

7. The packaging composite material as claimed in claim 2, wherein the packaging composite material further comprises a surface layer bonding layer located between the polarizing layer and the first surface layer.

8. The packaging composite material as claimed in claim 7, wherein a material of the surface layer bonding layer is selected from one of polyvinyl alcohol adhesives, acrylate adhesives, ethylene-vinyl acetate copolymer adhesives, epoxy resin adhesives, unsaturated polyester adhesives and vinyl acetate resin adhesives.

9. The packaging composite material as claimed in claim 1, wherein the polarizing layer further comprises a polarizing film bonding layer located between the polarizing films.

10. The packaging composite material as claimed in claim 9, wherein a material of the polarizing film bonding layer is selected from one of polyvinyl alcohol adhesives, acrylate adhesives, ethylene-vinyl acetate copolymer adhesives, epoxy resin adhesives, unsaturated polyester adhesives and vinyl acetate resin adhesives.

11. The packaging composite material as claimed in claim 1, wherein the polarizing layer comprises 3-10 layers of polarizing film.

12. A packaging composite material comprising:
a polarizing layer, comprising two or more layers of uniaxially-stretched polarizing film, wherein each layer of polarizing film has been uniaxially stretched in a stretching direction and wherein each layer of polarizing film has a polarization direction corresponding to the stretching direction;
a first surface layer located on one side of the polarizing layer; and
a second surface layer located on another side of the polarizing layer;
wherein the packaging composite material further comprises surface layer bonding layers located between the polarizing layer and the first and second surface layers respectively,
wherein the polarization directions of at least two layers of the two or more layers of polarizing film have an included angle which is not 0°, and
wherein the packaging composite material has a light-blocking effect.

13. The packing composite material as claimed in claim 12, wherein a material of the surface layer bonding layers is selected from one of polyvinyl alcohol adhesives, acrylate adhesives, ethylene-vinyl acetate copolymer adhesives, epoxy resin adhesives, unsaturated polyester adhesives and vinyl acetate resin adhesives.

* * * * *